United States Patent
Porte et al.

(10) Patent No.: US 6,947,614 B2
(45) Date of Patent: Sep. 20, 2005

(54) WIDE BAND ELECTRO-OPTICAL MODULATORS

(75) Inventors: Henri Porte, Serre les Sapins (FR); Jerome Hauden, Besancon (FR); Pascal Mollier, Besancon (FR)

(73) Assignee: Centre National de la Recherche Scientifique (C.N.R.S.), Paris Cedex 16 (FR)

( * ) Notice: Subject to any disclaimer, the term of this patent is extended or adjusted under 35 U.S.C. 154(b) by 19 days.

(21) Appl. No.: 10/416,891

(22) PCT Filed: Nov. 15, 2001

(86) PCT No.: PCT/FR01/03590

§ 371 (c)(1), (2), (4) Date: Oct. 23, 2003

(87) PCT Pub. No.: WO02/41073

PCT Pub. Date: May 23, 2002

(65) Prior Publication Data

US 2004/0062466 A1 Apr. 1, 2004

(30) Foreign Application Priority Data

Nov. 16, 2000 (FR) .......................................... 00 14804

(51) Int. Cl.[7] .............................. G02F 1/035; G02B 6/10
(52) U.S. Cl. ................................ 385/2; 385/3; 385/130
(58) Field of Search ................................ 359/1, 2, 3, 4, 359/5, 251; 385/1, 2, 3

(56) References Cited

U.S. PATENT DOCUMENTS

| | | | | |
|---|---|---|---|---|
| 5,267,336 A | * | 11/1993 | Sriram et al. ................... | 385/2 |
| 5,291,565 A | * | 3/1994 | Schaffner et al. ............... | 385/3 |
| 5,339,190 A | * | 8/1994 | Yamamoto et al. ........... | 359/332 |
| 6,055,251 A | * | 4/2000 | Ouchi et al. .................... | 372/28 |
| 6,101,296 A | * | 8/2000 | Tavlykaev et al. .............. | 385/2 |
| 6,229,828 B1 | * | 5/2001 | Sanders et al. ................ | 372/22 |
| 6,236,772 B1 | * | 5/2001 | Tavlykaev et al. .............. | 385/2 |

OTHER PUBLICATIONS

T. Kishino et al., "70+ mu m deep domain inversion in X–cut LiNbO/sub 3/ and its use in a high–speed bandpass integrated–optic modulator", Applied Physics Letters, Jun. 26, 2000, AIP, USA, vol. 76, No. 26, pp. 3852–3854, XP00096335, ISSN: 0003–6951.

(Continued)

*Primary Examiner*—Frank G. Font
*Assistant Examiner*—Charlie Peng
(74) *Attorney, Agent, or Firm*—Young & Thompson

(57) ABSTRACT

An optical modulator includes a waveguide structure forming a two-wave interferometer made of an electro-optical material, and two arms, a set of electrodes connected to a controllable electric source for applying an electric field on at least one of the arms of the interferometer, so as to vary the phase difference between light waves along one or the other of the two arms. The modulator includes two sets of electrodes placed respectively on each of the interferometer arms, one in the non-reversed region of the electro-optical material, the other in the reversed region, and a delay line placed between the control electronics of the electrode sets introducing a delay equal to the light propagation time in the first electrode set.

19 Claims, 4 Drawing Sheets

OTHER PUBLICATIONS

Patent Abstracts of Japan, vol. 2000, No. 12, Jan. 3, 2001 & JP 2000 249994 A (Fujitsu Ltd), Sep. 14, 2000 abstract.

J.H. Schaffner et al., "Velocity–Matching in Millimeter Wave Integrated Optic Modulators with Periodic Electrodes" Journal of Lightwave Technology, US, IEEE. New York, vol. 12, No. 3, Mar. 1, 1994, pp. 503–511, XP000469804, ISSN: 0733–8724.

K.W. Hui et al., "Electrode Optimization for High–Speed Traveling–Wave Integrated Optic Modulators" Journal of Lightwave Technology, US, IEEE. New York, vol. 16, No. 2, Feb. 1, 1998, pp. 232–238, XP000750663, ISSN: 0733–8724.

A.S. Semenov et al., "Compensation of the Velocity Mismatch in Traveling–Wave Modulators Utilizing a Cumulative Interaction" Soviet Journal of Quantum Electronics, US, American Institute of Physics. Woodbury, NY, vol. 22, No. 1, 1992, pp. 73–78, XP000273648.

S. Samson et al., "Electro–optic measurements using a Mach–Zehnder interferometer with domain reversals" Photonic Component Engineering and Applications, Orlando, FL, USA, Apr. 8–9, 1996, vol. 2749, pp. 186–194, XP001016441 Proceedings of the SPIE—The International Society for Optical Engineering, 1996, SPIE–Int. Soc.Opt.Eng, USA, ISSN: 0277–786X.

* cited by examiner

WIDE BAND ELECTRO-OPTICAL MODULATORS

BACKGROUND OF THE INVENTION

This invention relates to the field of integrated optoelectronic components applicable particularly in the field of optical telecommunications.

This invention more particularly relates to an electro-optical light modulator liable to be made in particular with lithium niobate. Its configuration requires a cascade structure of two sets of electrodes aligned parallel to a wave guide structure forming a two-arm interferometer for example, a Mach-Zehnder interferometer. A first set is deposited on a portion of crystal whereof the ferroelectric field is oriented with positive (or negative) polarisation, the second set of electrodes being on the other half of the crystal exhibiting a field of negative (or positive) reversed ferroelectric polarisation.

DESCRIPTION OF THE RELATED ART

Recent evolutions in optical fibre transmissions require higher and higher channel information flow rates, in the order of 40 Gbit/s. Each channel being in such a case a wavelength channel of the emission lasers. This is referred to as wavelength multiplexing. The spectral interval between channels, the stability of the emission frequency as well as the spectral finesse of semiconductor lasers used, involve using optical modulators external to the optical source in order to graft the information to the channel.

Optical modulators made out of lithium niobate electro-optical crystals enable to fulfil this external modulation function. They are subject to industrialisation based upon a proven technology. However, their implementation at flow rates as high as 40 Gb/s involves the simultaneous resolution of a number of problems. These problems are notably those of a flat frequency response of the modulator, its power consumption which increases rapidly with the modulation frequency. The point is to obtain, moreover, as well as frequency-range response, low control voltages, the latter being limited by the control electronics. Finally, at flow rates as high as 40 Gb/s, dispersion problems arise, although small when compared to the external modulation of the light—by a modulator—at the direct modulation of a semiconductor laser. These dispersion problems, with external modulators, for example in lithium niobate, are connected to the ratio between the residual phase modulation and the intensity modulation generated. This ratio is called "chirp".

The conventional configuration of an integrated optical modulator of this lithium niobate type calls for a number of principles:

The first principle is based on the fact that the lithium niobate crystal employed most frequently is electro-optical, which means that application of an external electric field to the faces suitably oriented of the crystal, spaced by a given distance, translates into a variation in the refraction index of the material and, consequently, by a linear phase variation of the optical wave going through it over a given length. This operation involves that the electric field of light possesses a preferred polarisation direction, parallel or perpendicular to the static electric field applied. An interferometric assembly enables then to convert this phase variation into an intensity modulation which can be sensed by a photodetector.

The second principle is based on the fact that, in such a material, doping by metallic ions or by protons enables to increase the refraction index locally, in the form of a narrow area for example, so that the light may be injected into the micro-channel generated by this increased index, and may propagate by successive internal total reflections without any divergence in the optical wave guide thus provided. It is then possible to obtain complex optical circuits whereon the realisation of electrodes, along the guide whereof the typical width is in the order of 10 μm, enables to apply a very high electric field with low control electric voltage (5 V), compatible with what is required in electronic telecommunications systems.

A structure called Mach-Zehnder interferometer described by FIG. 1A, as a top view and as a sectional view on FIG. 1B, enables the integration of a whole modulator. The optical circuit, comprising optical guide sections is integrated on one Z-shaped lithium niobate substrate 1. It is composed, in such a case, of a rectilinear guide section 2' for the insertion of light, of wavelength, in the vacuum λ, followed by a Y-shaped branch 3, which separates the propagated light towards two other rectilinear and parallel sections 4' and 4" which form each of the arms of the interferometer. After a propagation length L, both arms are recombined by a second Y-shaped junction 3' terminated by a last section 2" which recombines the waves and leads the light towards the output of the device. The phase spacing created between the arms by the electric field translates, by an interference phenomenon, into an intensity modulation of the transmitted light.

A possible embodiment of the structure of optical guides consists in depositing on the surface of the crystalline substrate a titanium layer, of preset thickness, by vacuum evaporation techniques of thin layers. In this titanium layer, the pattern of the guides is defined using conventional photolithography techniques, then is diffused at high temperature for a fixed period. During thermal diffusion, the metallic ions enter the crystal and the resulting doping translates into local increase in the refraction index according to an amplitude, depth and width profile which may be calculated and measured. The luminous field which propagates has a spatial range matching substantially the index profile.

The operation of the modulator involves moreover a thin layer 5 of perfectly insulating dielectric material, such as for example of the silica of given thickness e. Besides, electrodes 6 are deposited by photolithographic transfer techniques to the surface of the device. A possible solution to obtain this structure of electrodes consists in placing a conductive line C parallel to one of the arms 4' of the interferometer. In the case of a substrate carrying the optics of a Mach-Zehnder interferometer, whereof the main surface, in the most favourable configuration to obtain a modulator with very wide electric pass-band, is cut perpendicular to the main axis Z (or c) of the lithium niobate crystal considered, the conductive electrode will be, for example, arranged above the arms 4". On either side of this central line of width w, are then arranged at a distance s two ground planes, as shown on FIG. 1B. When the distance s is in the order of some fifteen micrometers, a very high electric field may be applied between the main conductor C and the symmetrical ground planes M and M'.

A possible solution used generally to increase the efficiency of the phase modulation consists in placing one of the ground planes just above the second arm 4, as represented on FIGS. 1A and 1B. In such a case, the guides 4 and 4' are subject to the influence of electric fields of opposite signs going through them. The phase variation relative introduced by the electro-optical effect may be improved by approximately a factor of two by this configuration.

In this very situation is involved a parameter which is decisive for the "chirp" amplitude generated by the modulator. Indeed, the resulting semi-wave voltage $V_\pi$ is reversely proportional to the interaction length L, to the electro-optical coefficient $r_{33}$ considered of the material, to the cube of extraordinary refraction index $n_e$ of the material seen by the light propagating through the material and is proportional to the deviation s between the electrodes at the wavelength of light. The semi-wave voltage is therefore the weaker as the electrodes are long and close. On the other hand, this semi-wave voltage is weighed by the reverse of a so-called overlap coefficient $\eta$, whereof the value ranges between 0 and 1, and which translates the efficiency of interaction between the electric luminous field 7 and the electric static field 8, each being non homogeneous besides. As shown on FIG. 1B, the electric field distribution 8 is not the same under the central electrode C and under the edge of the lateral ground planes M and M'. Therefore, one obtains for the guide situated beneath the central electrode an overlap $\eta_1$ different from that $\eta_2$ obtained by the guide situated beneath one of the lateral ground electrodes. Consequently, the application of a voltage to the terminals of the electrodes causes phase variations of different signs and of different amplitudes in each of the arms. After recombination, the waves interfere and are intensity modulated. The excess of modulation of one arm relative to the other is converted into pure phase modulation. If a harmonic pulse signal $\Omega$ is applied, by means of a signal source 9, to the electrodes connected to adapted termination impedance 10, it translates by an amplitude modulation but also by a residual phase modulation which cause instant modulation of the frequency of the optical carrier. This is designated as frequency <<chirp>> which translates by a widening of the spectrum of the luminous source. This may be detrimental to the quality of a transmission in a dispersive medium and translate in a degradation of the signal shape which jeopardises the reception of a digital signal.

Under certain conditions, the aim will consist nevertheless in controlling the amplitude of this spectral widening, and especially its sign, in order to realise pulse compression if the dispersion sign of the propagation medium lends itself to the procedure.

To break away from the frequency <<chirp>>, the best solution consists generally in balancing perfectly the overlap ratio $\eta$ in each of the arms. The means to reach this target requires working with a crystal section different from Z. The X-section enables to obtain a structure wherein both guides are situated on either side of the central electrode, in the middle of the region separating them from each lateral electrode. FIG. 1C shows a possible solution to obtain this structure on one X-section substrate 11, seen from above. The field applied going through the guides is horizontal and the symmetrical structure is such that the overlaps are identical in each of the arms. FIG. 1D shows, as a cross-sectional view, the distribution of the field lines 8 and the position of the luminous fields 7 transmitted by the guides relative to the electrodes. However, it is possible to show that the frequency response of an X-section modulator is less favourable than that of a Z-section modulator.

A solution to eliminate or control the frequency "chirp" on Z-section lithium niobate crystals, consists in obtaining two sets of symmetrical electrodes 12 with a central conductor on each of the arms, in order to render the structure symmetrical. In such a case, there is a signal source 9. The signal source 9 is connected to two control amplifying electronics 13' and 13" for each of the arms. Moreover, an electronic Flip-flop 14 must be added to the inputs in order to reverse the polarity of the electric field applied. FIG. 1E shows a form of embodiment seen from below. FIG. 1F represents the position of the guides relative to the electrodes as a cross-sectional view.

As regards the frequency response of the electrodes, said response is connected to the characteristic impedance of the line $Z_c$, the propagation speed of the microwave signal in the line connected to the microwave index $n_m$, at the attenuation of the line $\alpha$. The characteristic impedance $Z_c$ and the microwave index $n_m$ are linked to the geometrical parameters of the line such as the width of the central conductor, the spacing of the ground planes, the thickness of the electrodes, the thickness of the dielectric layer. The aim is to reach a microwave index $n_m$ which is equal to an optical refraction index $n_o$, in order to adapt the optical speeds and microwaves, so that the optical phase variation by electro-optical effect accumulates throughout the interaction. The other aim relates to the characteristic impedance which must be as close as possible to the output impedance of the source of the microwave signal and to the load impedance 10 located at the output of the line. A perfectly adapted line enables indeed to ensure that the propagating wave is not subject to any reflection liable to damage the quality of the modulated signal.

When the electrodes are designed so that the characteristic impedance $Z_c$ is adapted and that the microwave index $n_m$ is equal to the optical index $n_e$, whereas the single limiting element at the frequency response is the loss of propagation $\alpha$ in the electrodes. The loss of propagation in electric power along the line, expressed in decibels, is proportional to the length of the line and to the square root of the modulation frequency. This loss is expressed generally as $\alpha(f, L)=\alpha_0 f^{1/2}L$. $\alpha_0$ is expressed in $dB/cm/GHz^{1/2}$. Thus, for exemplification purposes, if $\alpha_0$ is equal to $-0.47$ $dB/cm/GHz^{1/2}$, then for 2 cm of electrodes, the pass-band at 40 GHz is $-6$ dB. If for 2 cm of electrodes, the semi-wave voltage is typically 6 Volts, For 1 cm of electrodes, corresponding to $-3$ dB of pass-band at 40 GHz, the semi-wave voltage will be 12 Volts, which represents a dissipated power four times greater. Moreover, it is very difficult to design and obtain control electronics with a 40 GHz pass-band capable of delivering 12 V peak to peak voltages.

SUMMARY OF THE INVENTION

The aim of the invention is therefore to provide an optical modulator having good frequency response and which eliminates the <<chirp>> phenomenon.

To this end, the invention relates to an optical modulator comprising:
- a wave guide structure making a two-wave interferometer made of an electro-optical material, and comprising two arms,
- a set of electrodes connected to a controllable electric power source enabling the application of an electric field to one at least of the arms of the interferometer, in order to vary the phase spacing between luminous waves along respectively one of the arms or the other.

According to the invention, the optical modulator comprises:
- two sets of electrodes located respectively on each of the arms of the interferometer, one in a non-reversed region of the electro-optical material, the other in a reversed region, and
- a delay line located between the electronics for controlling the sets of electrodes introducing a delay equal to the propagation time of light in the first set of electrodes.

This invention also relates to the features which will appear in the following description and which will be considered individually or according to all their technically possible combinations:

the substrate is a Z-shaped lithium niobate anisotropic crystal perpendicular to the surface;

the substrate is a Z-shaped lithium tantalate anisotropic crystal perpendicular to the surface;

the wave guide structure takes place by thermal diffusion of thin metallic layers;

the wave guide structure takes place by proton exchange;

the sets of electrodes are each closed on a load impedance;

the sets of electrodes are grouped and composed of two electrodes parallel to one another and composed each of two sections connected by an S-shaped length;

the modulator with grouped sets of electrodes does not comprise any delay line;

the sets of electrodes are grouped and composed of two electrodes parallel to one another and comprising an even number of parallel sections, connected by an S-shaped length, each section going through a region whereof the sign of the ferroelectric polarity is the reverse of that of the adjacent section;

the reversed region of the electro-optical material is obtained permanently by local application of a short pulse of an intense electric field;

the reversed region of the electro-optical material is obtained by electron bombardment;

the reversed region of the electro-optical material covers both arms of the interferometer over a length at least equal to that of one the sets of electrodes and covers these arms over a width at least equal to that of the luminous field;

the interferometer is a Mach-Zehnder interferometer;

each set of electrodes comprises a low loss central conductor centred respectively on each arm of the interferometer;

each set of electrodes comprises two symmetrical lateral ground planes arranged at a distance at least equal to twice the width of the central conductor;

the controllable electric power source comprises two variable gain control amplifiers enabling to control electric voltages, respectively applied to the electrodes relative to half the semi-wave voltage resulting from a single set of electrodes, in order to adjust the residual phase modulation;

the optical modulator comprises a delay line enabling to offset the application of the electric field, respectively on both sets of electrodes, so that the propagation time of the optical wave and of the external microwave are identical;

the delay line is passive;

the delay line is active.

Thus, the improvement in the performances of the integrated wide band optical modulators on niobate of lithium according to the invention is obtained while acting on the following points:

inversion of ferroelectric field on a portion of the optical path of the arms of the interferometer, realisation of a structure of Mach-Zehnder interferometer with guided wave on Z-section lithium niobate, realisation of a set of progressive wave electrodes on the portion of the arms of the interferometer not having been subject to any inversion of ferroelectric field, the central conductor of the set of electrodes being positioned above one of the arms of the interferometer, realisation of a set of progressive wave electrodes on the portion of the arms of the interferometer having been subject to the inversion of ferroelectric field, the central conductor of the set of electrodes being positioned above the other arm of the interferometer, use of two distinct control electronics, each delivering a peak to peak voltage equal to the semi-wave voltage $V_\pi$, the latter corresponding to an interaction length equal to the sum of the individual length of each of the sets of electrodes, each control electronic circuit, fed by the microwave signal source, pilots one of the sets of electrodes, a delay line is arranged between each control electronic circuit, so that the application of the signal on the downstream electronic circuit is synchronous with the upstream electronic circuit, taking into account the propagation speed of the optical wave in the guide and the duration of interaction in the upstream electrode.

BRIEF DESCRIPTION OF THE DRAWINGS

The invention will be described herewith in detail relative to the appended drawings wherein.

DESCRIPTION OF THE PREFERRED EMBODIMENTS

The component is obtained on a substrate 1 of ferroelectric lithium niobate, of Z section, the axis Z being, for example, oriented positively relative to the main surface of the crystal. It is referred to as orientation $Z^+$. The substrate carries a wave guide pattern of Mach-Zehnder interferometer. This pattern comprises a rectilinear input 2' and output 2" guide, two junctions Y, 3' and 3", connected by each of the arms 4' and 4" of the interferometer. The wave guides are obtained for example by titanium diffusion, or by the method of lithium/protons exchange.

The lithium niobate crystal comprises in its whole thickness a region 15 which has been subject to an inversion of ferroelectric field. This means that, by short and localised application of an electric field between both faces of the crystal, in the order of 20 kV/mm for a short time period, the spontaneous polarisation of the crystal changes direction permanently. The crystal is thus subject locally to an inversion of its polarity, hence the designation of ferroelectric field inversion. The direction of the axe Z is reversed. At the surface, the region 15 has a so-called orientation $Z^-$. The main consequence of this change of orientation, as regards the modulator, is that the sign of the electro-optical coefficient $r_{33}$ involved in the modulation is reversed. It means that, in the so-called reversed region, the application of a positive electric voltage cause a variation in the refraction index of opposite sign to that obtained in the so-called non-reversed region.

In the so-called non-reversed region, as shown on FIG. 2A corresponding to a cross-sectional view according to C1, a set of electrodes 6, of length $L_1$, is positioned with the central electrode aligned above the arms 4" of the interferometer. The index variation of this arm is, for example positive, with an overlap between the electric field and the luminous field $\eta_1$. The other arm 4' is situated under one of the ground electrodes and is subject to a negative index variation with an overlap ratio $\eta_2$.

In the so-called reversed region 15, as shown on FIG. 2B corresponding to a cross-sectional view according to C2, a second set of electrodes 16, of length $L_2$, is positioned with the central electrode aligned now above the arm 4' of the interferometer. An electric voltage $V_2$, of same sign as $V_1$, is applied to the terminals of the electrodes 16. The index variation of this arm is now negative because of the inversion of the sign of $r_{33}$. The overlap ratio is now $\eta_1$. The other arm 4" situated beneath one of the lateral electrodes is subject to a positive index variation, with an overlap ratio $\eta_2$, for symmetrical reasons.

Figure 3:
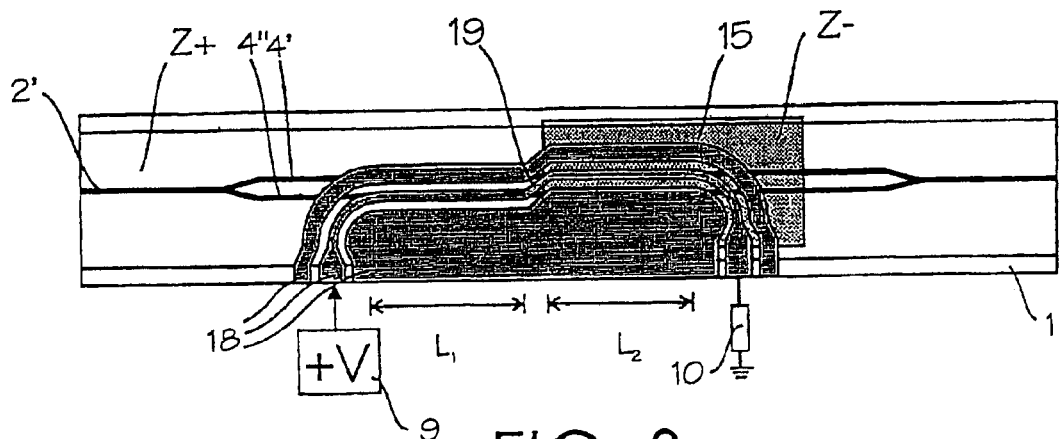
FIG. 3 is a top view of a second embodiment of the invention.

Another possibility is described by FIG. 3. In such a case, a single set of electrodes 18 is implemented, of total length $2L_1$. These electrodes are divided into two sections. The first section correspond to a position above the so-called non-reversed zone, with the central conductor positioned above the arm 4" then a second section connected to the first by an S-shaped adapter 19, which causes the central conductor to go from the arm 4" to the arm 4', in the so-called reversed crystal region. In such a case, a single voltage source is necessary. It will appear below that, in the case of such architecture, the frequency response is less favourable, but the necessary control power is less significant. Conversely, it will be shown below that the frequency "chirp" may be eliminated.

Figure 2:
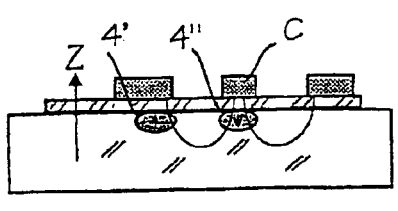
FIGS. 2A, 2B, 2C represent a first embodiment of the invention, FIG. 2C being a top view and FIGS. 2A and 2B, sectional views, respectively along the lines $c_1$ and $c_2$.
Figure 2:
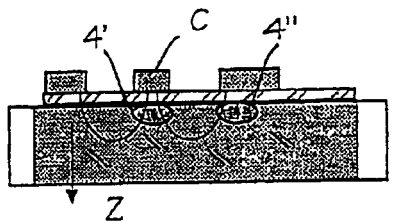
Figure 2:
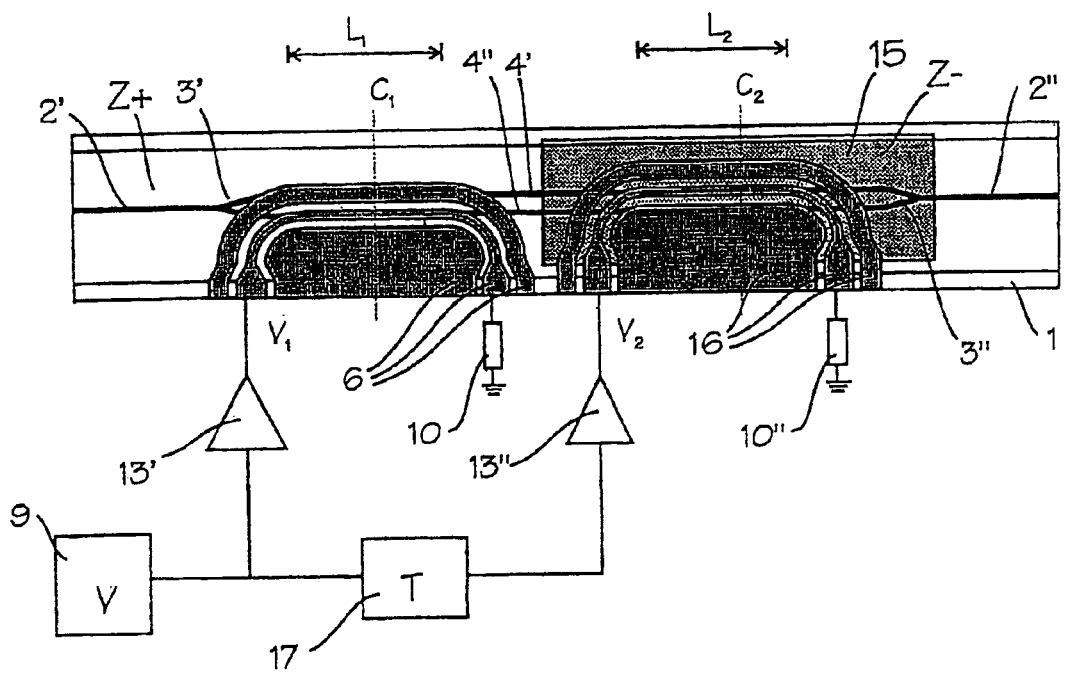

In either of these embodiments, with reference to the general structure of FIG. 2, the cumulated phase in the arm 4' for an interaction length of $L_1$ then $L_2$ is proportional to $+\eta_1 V_1 L_1 + \eta_2 V_2 L_2$. In the arm 4" for an interaction length of $L_1$ then $L_2$ the cumulated phase is proportional to $-\eta_2 V_1 L_1 - \eta_1 V_2 L_2$.

The intensity modulation, after recombination between the waves, depends on the cosine to the square of the difference between the phases cumulated in each of the arms, i.e.:

$$S = S_o \cos^2\left[\frac{2\pi}{\lambda s} n_e^3 r_{33}(\eta_1 V_1 L_1 + \eta_2 V_2 L_2 + \eta_2 V_2 L_1 + \eta_1 V_2 L_2)\right]$$

$S_O$ is proportional to the optical power incident in the component.

The residual phase modulation associated to the signal transmitted by the component, and which translates by the optical frequency "chirp", depends on the sum of the phases cumulated in each of the arms, i.e.:

$$\phi(V_1, V_2) = \frac{2\pi}{\lambda s} n_e^3 r_{33}(\eta_1 V_1 L_1 + \eta_2 V_2 L_2 - \eta_2 V_2 L_1 - \eta_1 V_2 L_2)$$

It can be seen that, in the simple case, corresponding notably to the situation presented on FIG. 3, for which $L_1=L_2$ and $V_1=V_2$, the residual phase variation is nil. The operation suppresses the unbalance between the electric field/luminous field overlap ratio of each arm, encountered generally with the Z-section components which possess only one set of electrodes with rectilinear central conductor aligned on a single arm of the interferometer. Thus, there is provided a "chirp"-less device. Conversely, by acting, as it is possible with the structure presented on FIG. 2, on one ratio between $V_1$ and $V_2$, it is possible to obtain adjustable "chirp", according to the application contemplated.

The voltages $V_1$ and $V_2$ may be adjusted by acting on the gain of the control amplifiers 13' and 13" driven by the signal source 9. The static description which has just been made does not take into account the dynamic behaviour of the device generally modulated by a time-related signal and covering a frequency range in the order of 40 GHz. Under these conditions, the propagation time of the electric and optical waves may be disregarded and notably, as indicated previously, the speeds of the optical waves and of the microwaves must be adapted. For the signal to accumulate along both sets of electrodes, it is necessary that the modulation applied by the second set of electrodes, while supposing that the light propagates from the guide 2' towards the output guide 2", is synchronous with the modulation which propagates in the first set of electrodes, this to avoid any phase delay liable to degrade the modulation efficiency. To do so, a delay line 17 is inserted between the electronics 13' and 13". The delay introduced corresponds exactly to the light transit time through the electrode section 6 of length $L_1$. For the device of FIG. 3, this delay line does not act since a single signal source is used with a single set of electrodes 18.

To determine the frequency response on the phase, one refers to the hypothesis where the characteristic impedances are adapted so that the hyper-frequency wave propagating through the electrodes is a progressive wave, and one assumes that the optical speeds and the microwaves are adapted. The main limiting factor is, in such a case, the voltage loss along the electrodes by dissipation of the energy in the conductor whereof the skin depth decreases with the frequency. Along each line, one considers thus an electric voltage amplitude distribution relative to the distance x covered, as follows:

$$V(x) = V_0 \exp(-\gamma\sqrt{\Omega}x)$$

$V_O$ is the amplitude of the voltage applied to the input of the electrodes. One may then show that, for low losses, the response on the phase difference after interaction with both sets of electrodes, by taking $V_1=V_2=V_O$ and $L_1=L_2+L$, is given approximately as:

$$\Phi_1 - \Phi_2 = \frac{2\pi}{\lambda s} n_e^3 r_{33}(\eta_1 + \eta_2) 2 V_o L \exp\left(-\gamma\sqrt{\Omega} \frac{L}{2}\right)$$

Figure 1:
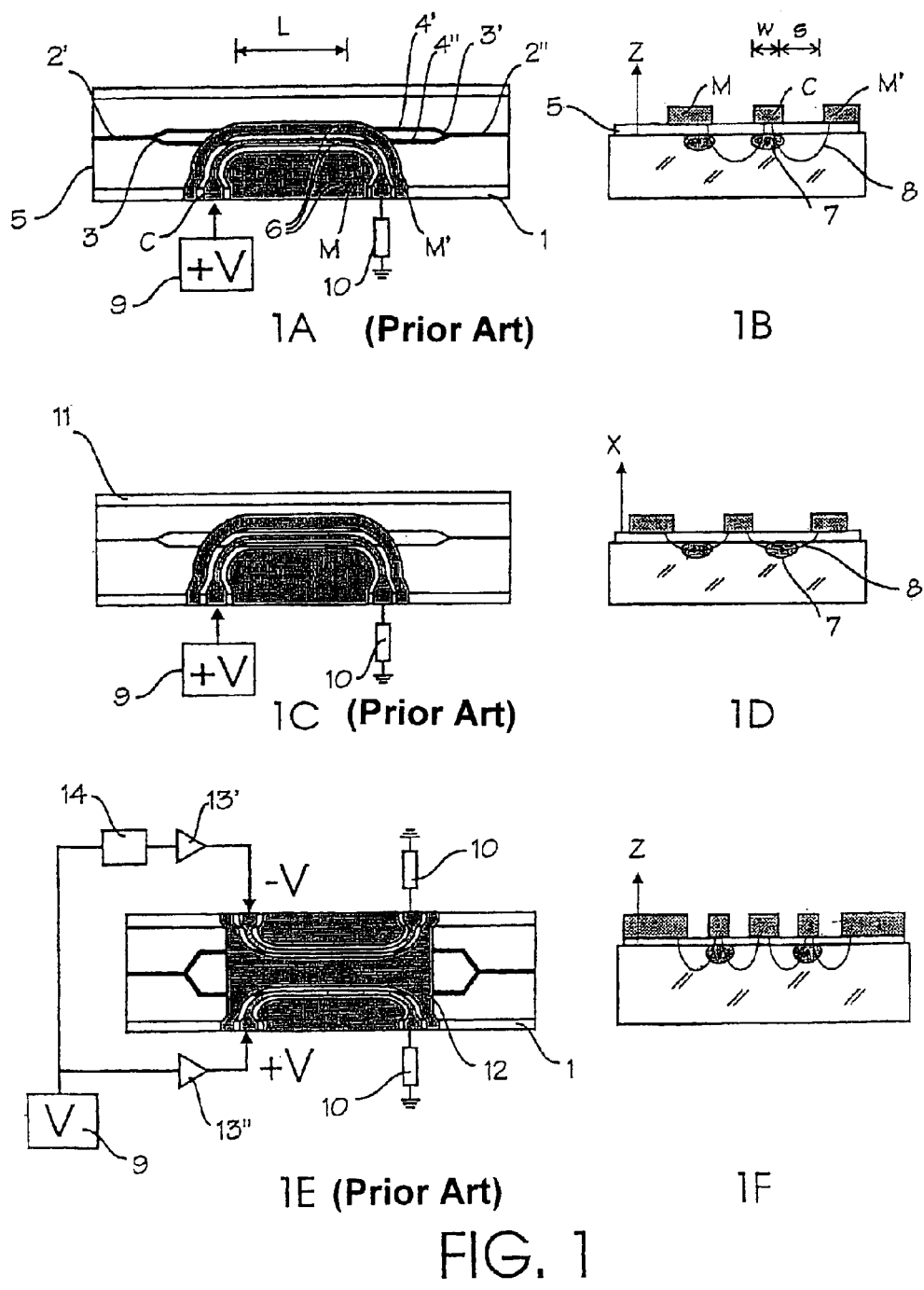
FIGS. 1A and 1B represent a prior art structure described above.
FIGS. 1C and 1D represent an X-section prior art structure described above.
FIGS. 1E and 1F represent a Z-section prior art structure also described above.

For comparison purposes, a modulator such as described by FIG. 1A, controlled by a single input voltage $V_O$, for a set of electrodes of total length 2L, has a phase response equal to:

$$\Phi_1 - \Phi_2 = \frac{2\pi}{\lambda s} n_e^3 r_{33}(\eta_1 + \eta_2) 2 V_o L \exp(-\gamma\sqrt{\Omega} L)$$

It can be observed that the voltage necessary $V_O$ to obtain a phase-shift of π radians is the same in each case, but the frequency attenuation is less significant in the first case. Said first case requires two electronics for controlling 13' and 13"

in order to power supply each set of electrodes, which represents twice as much a dissipated electric power. However, one may obtain the same frequency response with a single set of electrodes and a single control electronic circuit by dividing by two the length of the electrodes. In such a case, the control voltage necessary to obtain the same phase-shift will be equal to $2V_O$. in such a case, the power consumption will be twice as large. Besides, control electronics, supplying as in the latter case, high voltages on wide pass-bands, are not readily available at the moment, at a competitive price.

Figure 4:
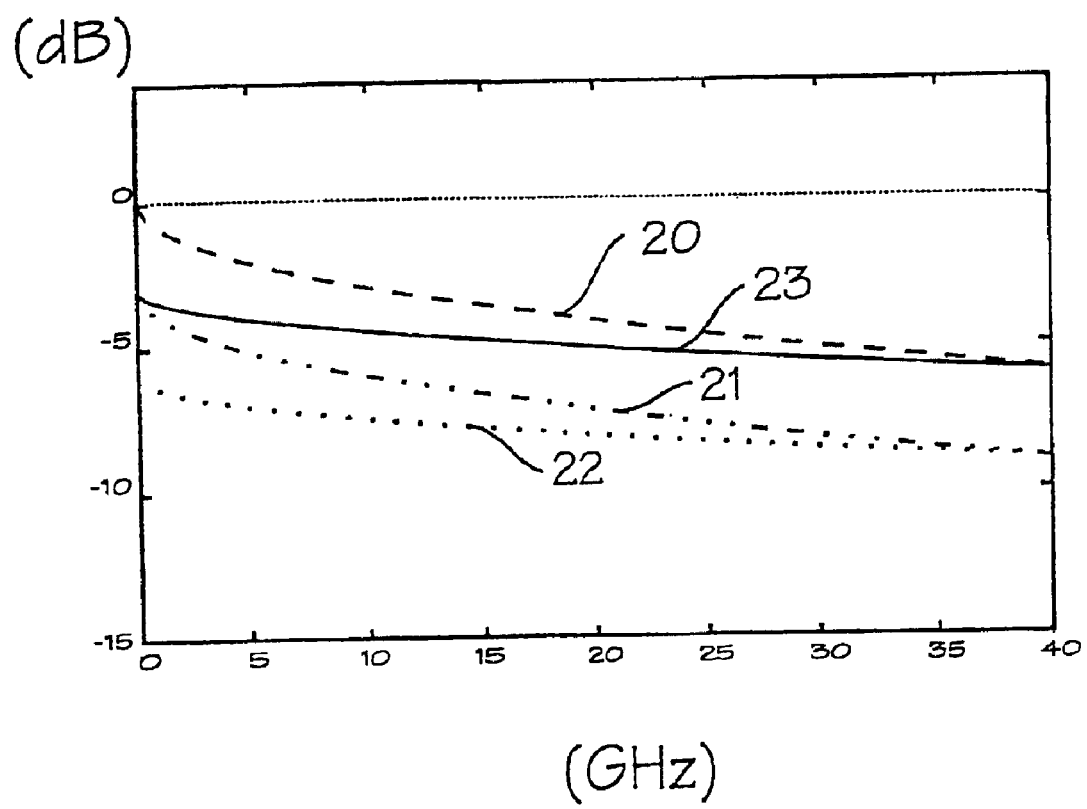
FIG. 4 is a compared representation of the performances according to the invention relative to the Z section of the prior art.

FIG. 4 enables to compare the electric power response of the optical signal detected according to the invention, relative to the prior art, for crystals cut into a Z-section. It provides in decibels the response relative to the frequency corresponding to each situation. These curves are obtained by assuming identical characteristics of the electrodes (width of the central conductor, spacing with respect to the ground plane, thickness of the electrodes, thickness of the electric layer). Are modified between each curve the control voltage(s) selected so that the used electric power is the same in each case. Are also modified according to the curves: the length, the number of electrodes involved, either in series or in parallel.

The curve 20 represents the case of a single set of electrodes of length 2L, controlled by a peak to peak voltage $V_O$ equal to the semi-wave voltage $V\pi$. The 0 Hz reference is situated at 0 dB. At 40 GHz, the signal loss is −6 dB. Moreover, the signal is affected by an optical frequency "chirp" because of the difference in the electric field/luminous field overlap ratios $\eta_1$ and $\eta_2$ corresponding to each arm.

The curve 21 represents the case of two sets of electrodes in parallel, of length 2L, controlled by a voltage $+V_O/\sqrt{2}$ for one electrode and $V_O/\sqrt{2}$ pour the other electrode. The used electric power is the same as in the previous case. The 0 Hz reference is situated at −3 dB. The necessary power to be implemented with two voltage sources is twice as high as in the first case to retrieve the same level of modulation. At 40 GHz, the signal loss is −6 dB, as previously, the electrodes having the same length. Conversely, the response is not affected by an optical frequency <<chirp>>, since the overlaps $\eta$ are identical for each arm. However, an electronic Flip-flop is necessary to reverse the signals between both inputs.

The curve 22 represents the case of a single set of electrodes of length L, controlled by a signal of peak to peak voltage equal to $V_O$, i.e. half the semi-wave voltage $V\pi$ necessary in such a case. The 0 Hz reference is situated at −6 dB, since the used electric power is four times larger to retrieve the same level of modulation than in the first case. At 40 GHz, this time, the signal loss is only −3 dB. Conversely, the response is affected by an optical frequency <<chirp>>.

Finally, the curve 23 represents the result object of this invention. It corresponds to the case of two sets of electrodes of length L each, i.e. a total length of interaction 2L. Each set is controlled by a tension $V_O/\sqrt{2}$. One of the sets of electrodes is positioned above a so-called non-reversed region, the other set being positioned on a so-called reversed region of the crystal. Moreover, the central conductor of the second set is aligned above an arm of the Mach-Zehnder interferometer different from that used for the first set of electrodes. The 0 Hz reference is situated at −3 dB. In such a case also, the necessary power to be implemented with two voltage sources is twice as high as in the first case to retrieve the same level of modulation. At 40 GHz, this time, the signal loss is only −3 dB, the response is therefore flatter. Besides, in such a case, the response is not affected by an optical frequency <<chirp>>, because of the equalisation of the average value of the overlap along each arm between both sets of electrodes. This solution constitutes a good compromise relative to the other solutions reported previously, between the requirements of low electric consumption, of flat frequency response, of low associated residual phase modulation (chirp).

A last case, object of this invention is in accordance with the curve 20. It is the case represented on FIG. 3, for which a single set of electrodes is implemented with reversal of the position of the central conductor at the passage between the so-called non-reversed region of the crystal, and the so-called reversed region of the crystal. The set of electrodes is unique of length 2L, controlled by a peak to peak voltage $V_O$ equal to the semi-wave voltage $V\pi$. At 40 GHz, the signal loss is −6 dB. Conversely, the signal is not affected by the associated residual phase modulation (chirp) for the same reasons as in the previous case.

To obtain a low chirp modulator, two architectures are therefore suggested. One is based upon the use of two sets of microwave lines arranged above sections of the arms of the interferometer of identical length, but opposed sign polarity, by artificial reversal of the ferroelectric field. This structure requires the use of two control electronics connected by a delay line.

The other structure is based upon the use of a single set of electrodes of coplanar line type whereof the central conductor goes from one arm of the interferometer to the other via an S-shaped curve, this change of arms corresponds to a polarity change of the material in order to keep a constructive phase modulation of light throughout the propagation in both regions of interaction with the electric field carried by the electrodes.

In this type of structure, the phase modulation amplitude created is, in absolute value, equal for each arm. The arrangement suggested balances the phase variation by introducing identical values for the overlaps of the electric fields and of the luminous fields.

However, because it is a microwave line liable to introduce propagation losses over the length of the electrodes, the energy may be partially dissipated at very high frequency in the first section of the electrode, and, consequently, the second section will contribute less efficiently to the modulation.

Figure 5:
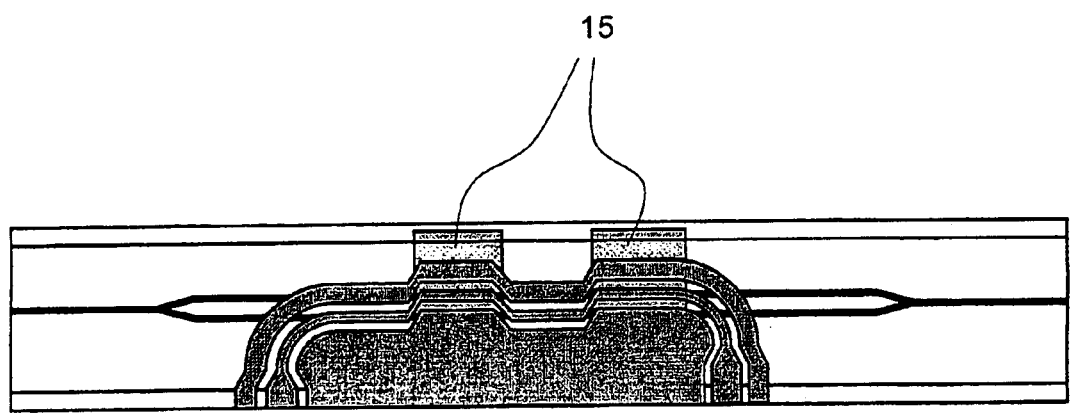
FIG. 5 is a top view of an alternative embodiment of the invention.

FIG. 5 provides an alternative of the invention wherein the device shows more than one pair of reversed field structures and as many sections of electrodes connected by S-shaped lengths, so that a section is never long enough individually to be exposed on its own to the effect of the propagation losses along the line. The zones 15 correspond to reversed regions. To each transition of a region to the other corresponds an S-shaped length.

What is claimed is:

1. Optical modulator comprising:
   a wave guide structure making a two-wave interferometer made of an electro-optical material, and comprising two arms,
   a set of electrodes connected to a controllable electric power source enabling the application of an electric field to one at least of the arms of the interferometer, in order to vary the phase spacing between luminous waves along respectively one arm or the other,
   characterised in that it comprises:
   two sets of electrodes located respectively on each of the arms of the interferometer, one in a non-reversed region of the electro-optical material, the other in a reversed region, a delay line located between the electronics for controlling the sets of electrodes introducing a delay equal to the propagation time of light in the first set of electrodes, and each set of electrodes comprises a low loss central conductor centered respectively on each arm of the interferometer.

2. An optical modulator according to claim 1, further comprising a substrate and characterised in that the substrate is a Z-shaped lithium niobate anisotropic crystal perpendicular to the surface.

3. An optical modulator according to claim 1, further comprising a substrate and characterised in that the substrate is a Z-shaped lithium tantalate anisotropic crystal perpendicular to the surface.

4. An optical modulator according to claim 1, characterised in that the wave guide structure takes place by thermal diffusion of thin metallic layers.

5. An optical modulator according to claim 1, characterised in that the wave guide structure takes place by proton exchange.

6. An optical modulator according to claim 1, characterised in that the sets of electrodes are each closed on a load impedance.

7. An optical modulator according to claim 1, characterised in that the sets of electrodes are grouped and composed of two electrodes parallel to one another and comprising an even number of parallel sections connected by an S-shaped length, each of the parallel sections going through a region whereof the sign of the ferroelectric polarity is the reverse of that of the adjacent section.

8. An optical modulator according to claim 7, characterised in that the sets of electrodes are grouped and composed of two electrodes parallel to one another and composed each of two sections connected by an S-shaped length.

9. An optical modulator according to claim 7, characterised in that it does not contain any delay lines.

10. An optical modulator according to claim 1, characterised in that the reversed region of the electro-optical material is obtained permanently by local application of an electric field pulse.

11. An optical modulator according to claim 1, characterised in that the reversed region of the electro-optical material is obtained by electron bombardment.

12. Optical modulator according to claim 10, characterised in that the reversed region of the electro-optical material covers both arms of the interferometer over a length at least equal to that of one of the sets of electrodes and covers these arms over a width at least equal to that of the luminous field.

13. An optical modulator according to claim 1, characterised in that the interferometer is a Mach-Zehnder interferometer.

14. An optical modulator according to claim 1, characterised in that each set of electrodes comprises two symmetrical lateral ground planes arranged at a distance at least equal to twice the width of the central conductor.

15. An optical modulator according to claim 1, characterised in that the controllable electric power source comprises two variable gain control amplifiers enabling to control electric voltages, respectively applied to the electrodes relative to half the semi-wave voltage resulting from a single set of electrodes, in order to adjust the residual phase modulation.

16. An optical modulator according to claim 15, characterised in that it comprises a delay line enabling to offset the application of the electric field, respectively on both sets of electrodes, so that the propagation time of the optical wave and of the external microwave are identical.

17. An optical modulator according to claim 16, characterised in that the delay line is passive.

18. An optical modulator according to claim 16, characterised in that the delay line is active.

19. Optical modulator comprising:

a wave guide structure making a two-wave interferometer made of an electro-optical material, and comprising two arms, a set of electrodes connected to a controllable electric power source enabling the application of an electric field to one at least of the arms of the interferometer, in order to vary the phase spacing between luminous waves along respectively one arm or the other, characterised in that it comprises:

two sets of electrodes located respectively on each of the arms of the interferometer, one in a non-reversed region of the electro-optical material, the other in a reversed region, a delay line located between the electronics for controlling the sets of electrodes introducing a delay equal to the propagation time of light in the first set of electrodes, and the controllable electric power source comprises two variable gain control amplifiers enabling to control electric voltages, respectively applied to the electrodes relative to half the semi-wave voltage resulting from a single set of electrodes, in order to adjust the residual phase modulation.

* * * * *